Patented June 25, 1946

2,402,819

UNITED STATES PATENT OFFICE 2,402,819

SYNTHETIC RUBBERLIKE MATERIALS COMPRISING 1,3-BUTADIENES

Frank Willard Johnson, Wilmington, Del., assignor to E. I. du Pont de Nemours & Company, Wilmington, Del., a corporation of Delaware No Drawing. Application May 20, 1942, Serial No. 443,722

12 Claims. (Cl. 260—84.5)

This invention relates to new rubber-like polymeric materials and, more particularly, to such materials made from 1,3-butadienes and esters of alpha-unsaturated carboxylic acids with unsaturated chlorinated alcohols.

It is well known that the rubber-like vulcanizates of polychloroprene are superior to those of natural rubber in such important respects as sunlight resistance, resistance to air or oxygen, and especially resistance to swelling in aromatic or aliphatic hydrocarbons or oils. On the other hand, polychloroprene vulcanizates tend to freeze or lose their characteristic elasticity more than those of natural rubber when cooled to low temperatures. By polymerization of chloroprene (2-chloro-1,3-butadiene) with certain other polymerizable materials, it is possible to prepare synthetic rubbers which are not only much more freeze resistant than polychloroprene, but, in fact, equal to or superior to natural rubber in this respect. However, the improvements in freeze resistance resulting from polymerization with other polymerizable materials are often accompanied by considerable sacrifice in the product yields as well as in such properties as tensile strength and resistance to swelling in oils. Similarly, freeze-resistant products obtained from butadiene hydrocarbons and other polymerizable materials are frequently lacking in solvent resistance.

One object of the present invention, therefore, is to provide synthetic rubber-like materials of outstanding freeze resistance combined with oil or solvent resistance. A further object is the preparation of freeze-resistant and oil-resistant rubber-like materials. A further object is to provide a new and valuable class of synthetic rubber-like polymers. Other objects will appear hereinafter.

These objects are accomplished by the invention of new rubber-like polymeric materials made from 1,3-butadienes and esters of unsaturated carboxylic acids with unsaturated chlorinated monohydric alcohols.

Among the various dienes which may be employed in the present invention, chloroprene and 1,3-butadiene itself are preferred in view of their availability at relatively low cost and the ease with which they polymerize. Esters of alpha-unsaturated carboxylic acids which are especially suitable for the present invention are the 3-chloro-2-butenyl esters of methacrylic and fumaric acids. For most purposes, it is preferable to conduct the polymerization in an aqueous emulsion, particularly to avoid the formation of low molecular weight addition products of the diene and ester. In general, the aqueous emulsion, which may contain small amounts of certain modifying agents as described hereinafter, is maintained at 20-25° C. by warming or cooling as necessary until it shows no further significant increase in specific gravity. At this point, antioxidants such as secondary aromatic amines, for example, phenyl alpha-naphthylamine and diphenylamine, and/or stabilizers such as the tetraalkyl thiuram disulfides are preferably added to the emulsions. Coagulation of the interpolymers is effected readily by the addition of alcohol or aqueous solutions of sodium chloride, magnesium sulfate, aluminum sulfate or the like, and the rubber-like coagula are then washed and dried on rubber mills in the usual manner. The compounding and curing of the rubbers are carried out in the manner commonly employed with polymers of chloroprene and butadiene.

The following examples are given to illustrate more fully certain of the preferred embodiments of the invention. The scope of the invention is not limited to these particular examples for there are many suitable variations thereof as will become apparent hereinafter. Parts given are by weight.

Example I

A mixture consisting of 82 parts of chloroprene and 18 parts of 3-chloro-2-butenyl methacrylate was emulsified in 223 parts of water to which had been added 1 part of sodium para toluene sulfinate, 4 parts of the sodium salts of sulfated oleyl acetate, 0.5 part of the sodium salts of the dinaphthylmethane sulfonic acid prepared from naphthalene, sulfuric acid, and formaldehyde according to U. S. Patent No. 1,336,759, and 0.54 part of 37 per cent hydrochloric acid. The polymerization was carried out at 40° C. for 2 hours and 45 minutes. The resulting dispersion of polymeric material was treated with 2 parts of a 50 per cent aqueous dispersion of a eutectic mixture containing 55 per cent of phenyl alpha naphthylamine and 45 per cent of diphenylamine, and 8 parts of a 25 per cent aqueous dispersion of tetra ethyl thiuram disulfide. The product was then coagulated by the addition of aqueous sodium chloride solution and was then washed free of soap with warm water on a corrugated mill and then dried by the usual procedure, giving a practically quantitative yield of a soft plastic rubber-like material. Ten (10) parts of this was compounded with 0.2 part of phenyl alpha naphthylamine, 1 part of magnesium oxide, 0.5 part of rosin, 3.6 parts of reinforcing carbon black and 0.5 part of zinc oxide and cured for 30 minutes in a mold at 145° C.

Example II

A mixture consisting of 82 parts of chloroprene and 18 parts of di-(3-chloro-2-butenyl) fumarate and 0.6 part of sulfur was dissolved in 225 parts of water containing 4 parts of the sodium salts of sulfated oleyl acetate, 0.5 part of the sodium salts of the dinaphthylmethane sulfonic acid used in Example I and 1.9 parts of glacial acetic acid. The resulting dispersion was polymerized at 40° C. for 3 hours and 15 minutes, and then treated with the dispersions of amine and thiuram disulfide as in Example I. The coagulum was milled on a mill with corrugated roll under a stream of cold water to remove the dispersing agents and to plasticize and was then dried further on a warm mill. The yield was 87 per cent of plastic rubber-like material which was compounded and cured as in Example I.

Example III

The charge consisting of 60 parts of butadiene and 40 parts of the 3-chloro-2-butenyl methacrylate used in Example I and 4 parts of oleic acid, 1.07 parts of sodium hydroxide, 1 part of ammonium persulfate, 1 part of the dinaphthylmethane sulfonate used in Example I, 0.5 part of octyl mercaptan and 150 parts of water was introduced into thick-walled glass tubes which were rotated end for end about a horizontal axis perpendicular to the length of the tube at a rate of about 35 revolutions per minute for 65 hours at 30° C. The polymerizable materials were thus rapidly dispersed in the emulsifying solution formed from the oleic acid and excess sodium hydroxide. After treatment with 2.5 parts of the eutectic mixture of amine antioxidant described in Example I, the dispersion of polymeric material was coagulated by the addition of saturated sodium chloride solution followed by dilute acetic acid. Ten (10) parts of the dried product were compounded with 0.2 part of phenyl alpha naphthylamine, 5 parts of reinforcing carbon black, 0.2 part of stearic acid, 0.2 part of sulfur, 0.1 part of mercapto benzothiazol, 0.5 part of zinc oxide, and 0.1 part of magnesium oxide and cured for 30 minutes at 145° C.

Example IV

Seventy (70) parts of butadiene and 30 parts of 3-chloro-2-butenyl fumarate were polymerized according to the methods described in Example III except that the temperature was 40° C. and the time was 40 hours, then coagulated, washed, and dried as already described. The product was compounded as in Example III and cured for 30 minutes at 131° C.

Example V

Sixty (60) parts of isoprene and 40 parts of 3-chloro-2-butenyl methacrylate were polymerized as in Example III. The product was coagulated, washed, and dried and then compounded and vulcanized all as described therein, giving an elastic rubber-like product.

Example VI

Fifty (50) parts of butadiene, 30 parts of 3-chloro-2-butenyl methacrylate and 20 parts of acrylic nitrile were polymerized as in Example III, giving a practically quantitative yield of a product which was isolated and compounded and as described in Example III, except that the vulcanization was for 20 minutes at 131° C.

The kerosene absorption of the rubber-like materials made according to the above examples was tested by immersing a sample of each in kerosene at 100° C. for 48 hours and measuring the increase in volume. The products were also tested for their resistance to freezing, the evaluation being carried out as follows: A sample of uniform cross section of the vulcanized material is stretched 170 per cent. It is cooled slowly in a bath to —70° C. in this stretched condition. The tension on the sample is then removed, the temperature is raised slowly, and the sample is allowed to contract freely. The temperatures, designated by "Temperature for retraction, 10%, 50%, 80%," at which the sample shows 10 per cent, 50 per cent, 80 per cent, etc., of the total retraction possible are recorded. The lower the temperature for a given per cent retraction, the greater the freeze resistance as the term is used in this application.

In the following table, the results of these tests have been recorded.

Table I

| Ex. | Diene | Ester | Temperature for retraction | | | Volume increase in kerosene after 48 hrs. at 100° C. |
|---|---|---|---|---|---|---|
| | | | 10% | 50% | 80% | |
| | | | °C. | °C. | °C. | Per cent |
| 1 | Chloroprene | Chlorobutenyl methacrylate | −35 | −13 | +2 | 56 |
| 2 | do | Chlorobutenyl fumarate | −30 | −16 | +1 | 58 |
| 3 | Butadiene | Chlorobutenyl methacrylate | −51 | −39 | −21 | 90 |
| 4 | do | Chlorobutenyl fumarate | −56 | −36 | −15 | 131 |
| 5 | Isoprene | Chlorobutenyl methacrylate | −52 | −42 | −25 | 94 |
| 6 | Butadiene | Chlorobutenyl methacrylate acrylic nitrile | −25 | −18 | −11 | 28 |

Suitable 1,3-dienes for the practice of the invention are the conjugated butadiene hydrocarbons such as 1,3-butadiene and its beta alkyl substitution products; e. g., isoprene and 2,3-dimethylbutadiene; and the haloprenes; e. g., chloroprene (2-chloro-1,3-butadiene) and bromoprene (2-bromo-1,3-butadiene).

Although in all the above examples the esters used are derived from 3-chloro-2-butenyl alcohol and methacrylic or fumaric acid, the invention is not limited to the use of these particular esters. Thus, as already stated, the acid may be any alpha-unsaturated carboxylic acid such as, for example, acrylic, chloroacrylic, maleic, citraconic, itaconic and the like, while the unsaturated chlorinated monohydric alcohol may be either primary, secondary, or tertiary, with either a straight or branched chain or with a cyclic structure, but preferably contains not more than 5 carbon atoms and preferably has the chlorine atom directly attached to one of the doubly bonded carbon atoms. Examples of other preferred alcohols are 3-chloro-2-propenol, 2-chloro-2-propenol, 2-chloro-2-butenol, 3-chloro-3-butenol, 3-chloro-2-methyl-2-butenol. For a method of preparation, see U. S. Patent No. 2,192,299. The chlorinated alcohol may also contain more than one chlorine atom or may contain bromine in place of chlorine. The esters used in the examples are preferred because of the availability of the alcohols and acids from which they are made and the desirable properties of the polymeric product which they form with the dienes.

The following are some of the preferred esters:

2-chloro-2-propenyl methacrylate
3-chloro-2-propenyl methacrylate
2-chloro-2-butenyl methacrylate
3-chloro-2-butenyl methacrylate
3-chloro-3-butenyl methacrylate
3-chloro-2-methyl-2-butenyl methacrylate
3-chloro-2-butenyl acrylate
3-chloro-2-butenyl chloroacrylate
3-chloro-2-butenyl maleate
3-chloro-2-butenyl fumarate
3-chloro-2-butenyl citraconate
3-chloro-2-butenyl itaconate The proportions of the polymerizable components initially present may be varied over a wide range, but, in order to obtain products of predominantly rubber-like properties, it is usually desirable that at least 50 per cent, by weight, of the total polymerizables be a 1,3-diene. The preferred initial ester concentration is 15 to 40 per cent, by weight, although valuable products are obtained from 1,3-diene ester compositions in which the ester concentration is above or below these preferred limits. For example, as the initial ester concentration is reduced below 15 per cent, the properties of the resulting rubbers become progressively more like those of the polydiene itself.

It is sometimes desirable to have present during the polymerization of the 1,3-diene and ester other polymerizable or non-polymerizable materials including vinyl- or vinylidene-type compounds such as styrene, vinyl acetate or vinyl propionate, esters of acrylic or methacrylic acids with saturated alcohols such as the methyl, ethyl, propyl, butyl, cyanomethyl alcohols, etc., acrylonitrile, methacrylonitrile, asymmetrical dichloroethylene, vinyl chloride, and the like; also film-forming materials, including paint or varnish adjuncts such as natural or synthetic resins, drying oils, cellulose derivatives and the like. The 1,3-diene should amount to at least half of the total weight of polymerizable and film-forming materials if a product of predominantly rubber like properties is desired. Furthermore, if the desirable properties arising from the use of the esters of unsaturated alcohols and unsaturated acids are to be retained to an important extent, the latter should be present in greater amount than the vinyl or vinylidene compound or film-forming material.

The polymerization of ester and 1,3-diene may be carried out by any of the conventional methods well known in the art such as in bulk without solvents or diluents in the presence of an inert solvent or in emulsion. As illustrated in the examples, it is preferred that the aqueous-emulsion technique be used to avoid the formation of undesirable low molecular weight products. Also, it gives higher yields and a more rapid and readily controlled polymerization. In aqueous emulsion, the polymerization may be carried out under alkaline, neutral, or acidic conditions. Neither the type of emulsifying agent or its concentration in the aqueous phase is critical. Examples of suitable emulsifying agents are sodium octyl sulfate, sodium oleyl sulfate, the sodium salt of sulfated oleyl acetate as illustrated in Example I, sodium isopropyl naphthalene sulfate as well as the corresponding potassium or ammonium salts; also N-stearyl betaine, N-hydroxypropyl-C-cetyl betaine, C-cetyl betaine, organic or inorganic salts of long-chain aliphatic amines such as octyl, lauryl, oleyl, stearyl amines and cetyl para-dimethyl aminobenzoate and the like. Under alkaline conditions, the sodium or potassium salts of oleic, palmitic, stearic, linoleic, linolenic, abietic (rosin) acids (see Example III, etc.), etc. are found to be satisfactory. Usually 1 to 4 per cent solutions of the emulsifying agents are employed, but, depending on the properties of the emulsifying agent as well as the particular polymerizable monomers and their ratio, stronger or weaker solutions, for example, 0.02 per cent to 10 per cent may be used. In general, therefore, any emulsifying or dispersing agent or any combination of two or more such agents which, when dissolved in water, is capable of producing a stable emulsion of the polymerizable materials, may be employed. The ratio of aqueous to non-aqueous phase in the emulsion may likewise be varied greatly. For practical purposes, the preferred concentration of the non-aqueous phase is between 30 and 50 per cent. Lower concentrations result in equally satisfactory products, but the process is less economical in view of the large reaction vessels required and the somewhat slower rate of polymerization. At higher concentrations, the polymerization is apt to proceed too rapidly to be controlled readily, although, under such conditions, satisfactory products likewise can be obtained. The emulsions may be agitated during polymerization by stirring or shaking in order to promote heat interchange with the temperature-controlling medium.

The polymerization may be accelerated, if desired, by means of any of the usual polymerization catalysts well known for this purpose. Such agents include organic or inorganic persulfates, perborates, or peroxides, for example, ammonium, potassium, or sodium persulfates, sodium or potassium perborates, hydrogen peroxide, acetyl peroxide, benzoyl peroxide, and the like. In slightly acidic emulsion systems, however, the addition of such catalysts is usually unnecessary, as illustrated in the examples. Under alkaline conditions, e. g., in a sodium rosinate emulsion, the use of 0.25 per cent to 2 per cent of a polymerization catalyst is more often desirable.

The preferred temperature of polymerization is between about 20° C. and 50° C. Higher temperatures are less desirable because of difficulties encountered in controlling the polymerization and also because, particularly in the case of 1,3-butadiene, elaborate apparatus is required to withstand the high pressure generated. On the other hand, at lower temperatures, i. e., below 20° C., the polymerization is slower, and, in addition, the vulcanizates have somewhat poorer freeze resistance than those prepared at higher temperatures, although the working properties are usually improved. The properties of the polymerizates, especially their plasticity and mill behavior, may be varied by including, with the polymerizable materials small proportions of agents which are known to modify the properties of the polymerized 1,3-dienes themselves. Thus, agents which give plastic products directly in the case of chloroprene include mercaptans, for example, amyl, octyl, lauryl, or xylyl mercaptan, hydrogen sulfide and thioglycolic acid, toluene sulfinic acids and sulfur dioxide. The polymeric products made from either the haloprenes or the 1,3-butadiene hydrocarbons in the presence of sulfur may be plasticized, if desired, by milling, for example in the presence of cold water, with a small amount of a thiuram disulfide, preferably a tetrasubstituted thiuram disulfide such as tetramethyl-, tetraethyl-, tetrabutyl, or dipentamethylene thiuram disulfide and other agents described in U. S. Patent No. 2,234,215 including the thionaphthols and the substituted ammonium salts of disubstituted dithiocarbamic acid. These agents are usually added to the polymerizate before coagulation.

Prior to coagulation of the copolymers, it is desirable to incorporate small amounts, e. g., 1 per cent to 2 per cent, of antioxidants, particularly secondary aromatic amines such as phenyl alpha- or phenyl beta-naphthylamine, and diphenylamine. At this stage also, agents such as the tetraalkyl thiuram disulfides which tend to stabilize the isolated polymers against changes in plasticity upon storage are preferably added. Further quantities of these agents may be added to the polymers during drying, if desired.

Coagulation of the interpolymers from emulsion may be effected by any of the well known methods such as by the addition of an aqueous solution of sodium chloride, magnesium sulfate, aluminum sulfate, and the like, by the addition of acids, bases, or alcohols, or by freezing. The compounding and curing of the products of the present invention are effected readily and satisfactorily by methods generally employed in the compounding and curing of the products of the natural rubber. In the case of products containing chloroprene, vulcanizates of excellent elasticity and good tensile strength are readily obtained from stocks compounded with zinc oxide, especially in combination with magnesium oxide or lead oxide. Incorporation of reinforcing or semi-reinforcing carbon blacks is usually desirable in order to obtain optimum tensile properties, particularly when the product contains a 1,3-butadiene hydrocarbon. Sulfur, rubber vulcanization accelerators, and various rubber or synthetic rubber plasticizers may be incorporated with the chloroprene products. In the case of products containing 1,3-butadiene hydrocarbons, the use of sulfur and vulcanization accelerators is usually necessary.

The products made according to the present invention are suitable for use in a variety of applications in which natural rubber or synthetic rubber-like materials are employed. The latex-like emulsions of the interpolymers can be employed as is natural rubber latex for the preparation of dipped, coated, or impregnated articles. Solutions of the interpolymers in organic solvents can likewise be used for the preparation of films, and various dipped, coated, calendered, or impregnated goods. In view of their excellent resistance to swelling in oils, vulcanizates of these products can be employed in many well known applications wherein poylchloroprene is used and where natural rubber is wholly unsatisfactory. Moreover, vulcanizates of the interpolymers described herein are, in general, much more freeze resistant than those of polychloroprene, and their usefulness, therefore, is greatly enhanced.

It is apparent that many widely different embodiments of this invention may be made without departing from the spirit and scope thereof, and, therefore, it is not intended to be limited except as indicated in the appended claims.

I claim:
1. Synthetic rubber-like material obtained by polymerizing 2-chloro-1,3-butadiene in the presence of an ester of an aliphatic unsaturated carboxylic acid containing not more than 4 carbon atoms and a monohydric, unsaturated, chlorinated alcohol containing 3 to 5 carbon atoms, wherein the 2-chloro-1,3-butadiene comprises from 50% to 85% of the total polymerizable material.

2. Synthetic rubber-like material obtained by polymerizing in emulsion a mixture of 2-chloro-1,3-butadiene and an ester of an aliphatic alpha-unsaturated carboxylic acid containing not more than 4 carbon atoms and a monohydric unsaturated chlorinated alcohol containing 3 to 5 carbon atoms wherein the 2-chloro-1,3-butadiene comprises from 50% to 85% of the total polymerizable material.

3. Synthetic rubber-like material obtained by poylmerizing in emulsion a mixture of 2-chloro-1,3-butadiene and an ester of an aliphatic alpha-unsaturated carboxylic acid containing not more than 4 carbon atoms and a monohydric unsaturated, chlorinated alcohol containing 3 to 5 carbon atoms, wherein the 2-chloro-1,3-butadiene constitutes from about 85 to about 60 per cent of the total polymerizable materials present.

4. Synthetic rubber-like material obtained by polymerizing 2-chloro-1,3-butadiene in the presence of a methacrylic acid ester of an aliphatic monohydric, unsaturated, monochlorinated alcohol containing 3 to 5 carbon atoms, wherein the 2-chloro-1,3-butadiene comprises from 50% to 85% of the total polymerizable material.

5. Synthetic rubber-like material obtained by polymerizing in emulsion a mixture of 2-chloro-1,3-butadiene and a methacrylic acid ester of an aliphatic monohydric, unsaturated, monochlorinated alcohol containing 3 to 5 carbon atoms wherein the 2-chloro-1,3-butadiene constitutes from about 85 to about 60 per cent of the total polymerizable material present.

6. Synthetic rubber-like material obtained by polymerizing 2-chloro-1,3-butadiene in the presence of a fumaric acid ester of an aliphatic monohydric, unsaturated, monochlorinated alcohol containing 3 to 5 carbon atoms, wherein the 2-chloro-1,3-butadiene comprises from 50% to 85% of the total polymerizable material.

7. Synthetic rubber-like material obtained by polymerizing in emulsion a mixture of 2-chloro-1,3-butadiene and a fumaric acid ester of an aliphatic monohydric, unsaturated, monochlorinated alcohol containing 3 to 5 carbon atoms wherein the 2-chloro-1,3-butadiene constitutes from about 85 to about 60 per cent of the total polymerizable material present.

8. Synthetic rubber-like material obtained by polymerizing 1,3-butadiene in the presence of an ester of an aliphatic unsaturated carboxylic acid containing not more than 4 carbon atoms and a monohydric, unsaturated, chlorinated alcohol containing 3 to 5 carbon atoms, wherein the 1,3-butadiene comprises from 50% to 85% of the total polymerizable material.

9. Synthetic rubber-like material obtained by polymerizing in emulsion a mixture of 1,3-butadiene and an ester of an aliphatic alpha-unsaturated carboxylic acid containing not more than 4 carbon atoms and a monohydric, unsaturated, chlorinated alcohol containing 3 to 5 carbon atoms, wherein the 1,3-butadiene comprises from 50% to 85% of the total polymerizable material.

10. Synthetic rubber-like material obtained by polymerizing in emulsion a mixture of 1,3-butadiene and an ester of an aliphatic alpha-unsaturated carboxylic acid containing not more than 4 carbon atoms and a monohydric, unsaturated, chlorinated alcohol containing 3 to 5 carbon atoms, wherein the 1,3-butadiene constitutes from about 85 to 60 per cent of the total polymerizable materials present.

11. Synthetic rubber-like material obtained by polymerizing in emulsion a mixture of 1,3-butadiene and a methacrylic acid ester of an aliphatic, monohydric, unsaturated, monochlorinated alcohol containing 3 to 5 carbon atoms, wherein the 1,3-butadiene comprises from 50% to 85% of the total polymerizable material.

12. Synthetic rubber-like material obtained by polymerizing a butadiene compound of the group consisting of butadiene and beta-haloprenes in the presence of an ester of an aliphatic unsaturated carboxylic acid containing not more than 4 carbon atoms and a monohydric unsaturated chlorinated alcohol containing 3 to 5 carbon atoms, wherein the butadiene compound comprises from 50% to 85% of the total polymerizable material.

FRANK WILLARD JOHNSON.

---

Certificate of Correction

Patent No. 2,402,819.  June 25, 1946.

FRANK WILLARD JOHNSON

It is hereby certified that errors appear in the printed specification of the above numbered patent requiring correction as follows: Column 7, line 35, for "the products of the" read *polychloroprene or of*; column 8, line 21, claim 3, for "poylmerizing" read *polymerizing*; and that the said Letters Patent should be read with these corrections therein that the same may conform to the record of the case in the Patent Office.

Signed and sealed this 3rd day of September, A. D. 1946.

[SEAL]

LESLIE FRAZER.
*First Assistant Commissioner of Patents.*

10. Synthetic rubber-like material obtained by polymerizing in emulsion a mixture of 1,3-butadiene and an ester of an aliphatic alpha-unsaturated carboxylic acid containing not more than 4 carbon atoms and a monohydric, unsaturated, chlorinated alcohol containing 3 to 5 carbon atoms, wherein the 1,3-butadiene constitutes from about 85 to 60 per cent of the total polymerizable materials present.

11. Synthetic rubber-like material obtained by polymerizing in emulsion a mixture of 1,3-butadiene and a methacrylic acid ester of an aliphatic, monohydric, unsaturated, monochlorinated alcohol containing 3 to 5 carbon atoms, wherein the 1,3-butadiene comprises from 50% to 85% of the total polymerizable material.

12. Synthetic rubber-like material obtained by polymerizing a butadiene compound of the group consisting of butadiene and beta-haloprenes in the presence of an ester of an aliphatic unsaturated carboxylic acid containing not more than 4 carbon atoms and a monohydric unsaturated chlorinated alcohol containing 3 to 5 carbon atoms, wherein the butadiene compound comprises from 50% to 85% of the total polymerizable material.

FRANK WILLARD JOHNSON.

Certificate of Correction

Patent No. 2,402,819.   June 25, 1946.

FRANK WILLARD JOHNSON

It is hereby certified that errors appear in the printed specification of the above numbered patent requiring correction as follows: Column 7, line 35, for "the products of the" read *polychloroprene or of*; column 8, line 21, claim 3, for "poylmerizing" read *polymerizing*; and that the said Letters Patent should be read with these corrections therein that the same may conform to the record of the case in the Patent Office.

Signed and sealed this 3rd day of September, A. D. 1946.

[SEAL]

LESLIE FRAZER.
*First Assistant Commissioner of Patents.*